(12) United States Patent
Weng et al.

(10) Patent No.: US 9,261,908 B2
(45) Date of Patent: Feb. 16, 2016

(54) SYSTEM AND METHOD FOR TRANSITIONING BETWEEN OPERATIONAL MODES OF AN IN-VEHICLE DEVICE USING GESTURES

(71) Applicant: Robert Bosch GmbH, Stuttgart (DE)

(72) Inventors: Fuliang Weng, Mountain View, CA (US); Zhongnan Shen, Milpitas, CA (US)

(73) Assignee: Robert Bosch GmbH, Stuttgart (DE)

( * ) Notice: Subject to any disclaimer, the term of this patent is extended or adjusted under 35 U.S.C. 154(b) by 146 days.

(21) Appl. No.: 14/208,785

(22) Filed: Mar. 13, 2014

(65) Prior Publication Data

US 2014/0281957 A1  Sep. 18, 2014

Related U.S. Application Data

(60) Provisional application No. 61/778,646, filed on Mar. 13, 2013.

(51) Int. Cl.
*G06F 3/00* (2006.01)
*G06F 1/16* (2006.01)
*G06F 3/0488* (2013.01)
*G06F 3/0346* (2013.01)
*G06F 3/0484* (2013.01)

(52) U.S. Cl.
CPC ............ *G06F 1/1626* (2013.01); *G06F 1/1694* (2013.01); *G06F 3/0346* (2013.01); *G06F 3/04883* (2013.01); *G06F 3/04847* (2013.01); *G06F 2203/04808* (2013.01)

(58) Field of Classification Search
CPC .................................................. G06F 3/04847
USPC .................................................. 715/702, 764
See application file for complete search history.

(56) References Cited

U.S. PATENT DOCUMENTS

| 2007/0080958 | A1  | 4/2007  | Chithambaram et al. |
| 2008/0184173 | A1  | 7/2008  | Sutanto et al. |
| 2009/0265671 | A1  | 10/2009 | Sachs et al. |
| 2011/0050589 | A1* | 3/2011  | Yan ........................ B60K 37/06 345/173 |
| 2012/0179965 | A1  | 7/2012  | Taylor |
| 2013/0024113 | A1* | 1/2013  | Weng ................. G01C 21/3644 701/455 |
| 2013/0053007 | A1  | 2/2013  | Cosman et al. |
| 2013/0311916 | A1* | 11/2013 | Weng ................... G01C 21/005 715/764 |
| 2014/0019522 | A1* | 1/2014  | Weng ................ G06F 17/30964 709/203 |
| 2014/0058584 | A1* | 2/2014  | Weng ....................... G06F 7/00 701/1 |
| 2014/0121883 | A1* | 5/2014  | Shen .................. B62D 15/0285 701/28 |

(Continued)

OTHER PUBLICATIONS

Google gesture search API, http://gesturesearch.googlelabs.com/api.html, published at least as early as Mar. 13, 2012.

(Continued)

*Primary Examiner* — William Titcomb
(74) *Attorney, Agent, or Firm* — Maginot Moore & Beck LLP

(57) ABSTRACT

A method of receiving user input includes operating a software program in a first operating mode and modifying a graphical interface of the software program in response to receiving gesture. The method also includes receiving a haptic input and operating the software program in a second operating mode in response to the haptic input. In the second operating mode, the gesture produces a different modification to the graphical interface than in the first operating mode.

14 Claims, 6 Drawing Sheets

(56) References Cited

U.S. PATENT DOCUMENTS

| | | | |
|---|---|---|---|
| 2014/0270382 A1* | 9/2014 | Cheng | G06K 9/00355 382/104 |
| 2015/0026613 A1* | 1/2015 | Kwon | G06F 3/04886 715/764 |
| 2015/0227492 A1* | 8/2015 | Bai | G06F 3/04842 715/762 |

OTHER PUBLICATIONS

ESRI ArcGIS Desktop Ink tool, http://webhelp.esri.com/arcgiSDEsktop/9.3/index.cfm?TopicName=Pen_tool, published at least as early as Mar. 13, 2012.

Mindjet MindManager Pen Mode gestures, http://onlinehelp.mindjet.com/mm72/Help/ENU/Pro/pen_mode_gestures.htm, published at least as early as Mar. 13, 2012.

AT&T Speak4It iPad/iPhone application, http://www.speak4it.com/, published at least as early as Mar. 13, 2012.

Yahoo Sketch-a-Seach iPhone application, http://ycorpblog.com/2010/03/23/sketch-a-search/, published at least as early as Mar. 13, 2012.

International Search Report and Written Opinion corresponding to PCT Application No. PCT/US2014/026087, mailed Jun. 26, 2014 (11 pages).

* cited by examiner

SYSTEM AND METHOD FOR TRANSITIONING BETWEEN OPERATIONAL MODES OF AN IN-VEHICLE DEVICE USING GESTURES

CLAIM OF PRIORITY

This application claims priority to U.S. Provisional Application No. 61/778,646, which is entitled "System And Method For Transitioning Between Operational Modes Of An In-Vehicle Device Using Gestures", and was filed on Mar. 13, 2013, the entire contents of which are hereby incorporated by reference herein.

FIELD

This disclosure relates generally to the field of automated assistance and, more specifically, to systems and methods that enable touch screens to interpret haptic input.

BACKGROUND

Modern motor vehicles often include one or more in-vehicle information systems that provide a wide variety of information and entertainment options to occupants in the vehicle. Common services that are provided by the in-vehicle information systems include, but are not limited to, vehicle state and diagnostic information, navigation applications, hands-free telephony, radio and music playback, and traffic condition alerts. In-vehicle information systems often include multiple input and output devices. For example, traditional buttons and control knobs that are used to operate radios and audio systems are commonly used in vehicle information systems. More recent forms of vehicle input include touch-screen input devices that combine input and display into a single screen, as well as voice-activated functions where the in-vehicle information system responds to voice commands. Examples of output systems include mechanical instrument gauges, output display panels, such as liquid crystal display (LCD) panels, and audio output devices that produce synthesized speech.

One type of an in-vehicle information system is an in-vehicle navigation assistance system and one use of such a system is to locate points-of-interest (POIs) on a displayed map or portion of a displayed map. Being able to locate POIs involves two modes of operation of the in-vehicle navigation assistance system: an object view mode and an object modification mode. In the object view mode, the display of an object is changed. For example, if a map of an area is being displayed, the display may be changed to an adjacent area by moving a finger over the displayed map to the right or left to bring a map of the adjoining right or left region into view. In the object modification mode, a particular portion of the displayed object is modified, typically, with a drawing or the like. An example of this mode of operation occurs when a user, who is attempting to find a POI such as a restaurant in a particular area of a displayed map, uses a finger to encircle the portion of the displayed map in which the user is interested. The in-vehicle navigation assistance system then limits its search for restaurants to those within the encircled region.

One difficulty presented by the in-vehicle navigation assistance system described above is the mechanism used to select the mode of operation for the system. In previously known systems, the operational mode is changed by a manual actuator or a touch button presented on the display. Use of such an actuator or button can disrupt the user's work flow as the user needs to move his or her hand from the area of the display that is the focus of the task at hand to the perimeter where the actuator or button is located. A voice command may be used if the system is configured for audible input, but the processing of voice commands can be time consuming and confusing as the system sometimes misidentifies a voice command. Additionally, environmental conditions, such as conversations, music, or road noise, can interfere with a system's ability to interpret voice commands. Therefore, improved systems and methods for manipulating the operational mode of in-vehicle information systems would be beneficial.

SUMMARY

An in-vehicle information system enables a user to set the operational mode of an in-vehicle information system with simple gestures or actions. The system interprets gesture inputs and haptic inputs to indicate either a particular operational mode or a change in the current operational mode. The system implements a method of changing the operational mode of an in-vehicle information system through simple gestures or actions, rather than mechanical actuators or touch screen buttons.

In one embodiment a method of operating a computing device in different operating modes using haptic and gesture input has been developed. The method includes executing with a controller in the mobile electronic device stored program instructions for a software program in a first operating mode, generating with the controller and a graphical display device in the mobile electronic device a graphical user interface (GUI) for the software program in the first operating mode, receiving with a first input device in the mobile electronic device configured to receive gesture input a first gesture from a user in the first operating mode, generating with the controller a first modification of the GUI for the software program in the first operating mode in response to the first gesture, identifying with the controller a predetermined haptic input received from a second input device configured to receive haptic input in the mobile electronic device, executing with the controller the stored program instructions for the software program in a second operating mode in response to identifying the predetermined haptic input, the second operating mode being different than the first operating mode, receiving with the first input device the first gesture from the user in the second operating mode, and generating with the controller a second modification of the GUI for the software program in the second operating mode in response to the first gesture, the second modification of the GUI being different than the first modification of the GUI.

In another embodiment a method of operating a computing device in different operating modes using gesture input has been developed. The method includes executing with a controller in the computing device stored program instructions for a software program in a first operating mode, generating with the controller and a graphical display device in the computing device a graphical user interface (GUI) for the software program in the first operating mode, receiving with an input device configured to receive gesture input a first gesture from a user in the first operating mode, generating with the controller a first modification of the GUI for the software program in the first operating mode in response to the first gesture, identifying with the controller a second predetermined gesture received from the input device, the second predetermined gesture being different than the first gesture, executing with the controller the stored program instructions for the software program to operate in a second operating mode in response to the second predetermined gesture, receiving with the input device the first gesture from the user in the second operating mode, and generating with the controller a second modification of the GUI for the software program in the second operating mode in response to the first gesture, the second modification of the GUI being different than the first modification of the GUI.

In another embodiment a computing system that is configured to operate in different modes using gesture input has been developed. The system includes a display device, a first input device configured to receive gesture input from a user, and a controller operatively connected to the display device and the first input device. The controller is configured to execute stored program instructions for a software program in a first operating mode, generate a graphical display a graphical user interface (GUI) for the software program in the first operating mode, receive a first gesture from the user while the software program operates in the first operating mode, generate a first modification of the GUI for the software program in the first operating mode in response to the first gesture, receive a second predetermined gesture from the user that is different than the first gesture, execute the stored program instructions for the software program to operate in a second operating mode in response to the second predetermined gesture, receive the first gesture from the user while the program operates in the second operating mode, and generate a second modification of the GUI for the software program in the second operating mode in response to the first gesture, the second modification of the GUI being different than the first modification of the GUI.

DETAILED DESCRIPTION

Figure 1:
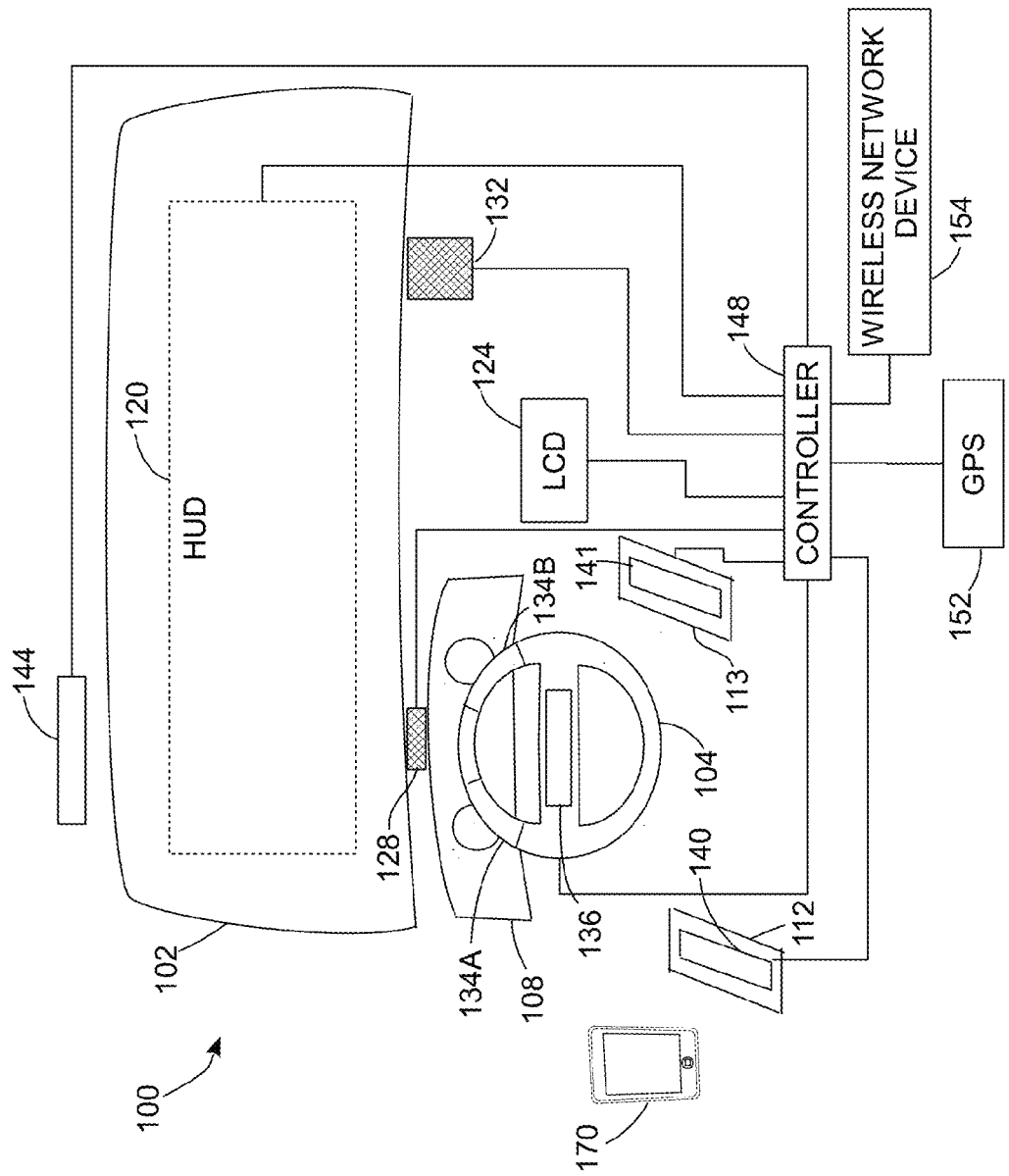
FIG. 1 is a schematic view of components of an in-vehicle information system in a passenger compartment of a vehicle.

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term "mobile electronic device" refers to any portable computing system that includes a digital controller, display devices, touchscreen or other gesture input devices, and cameras. Examples of mobile electronic devices include smartphones, tablets, handheld computing devices, wearable computing devices, and the like.

As used herein, a reference to the terms "gesture" and "input gesture" are used interchangeably and refer to hand movement, bodily movement, or movement of an input tool, such as from a stylus, which a mobile electronic device recognizes as a valid form of input from a user to control the modification of a graphical user interface (GUI) during execution of a software program. As used herein, references to input gestures do not include tap or button pushing interaction with physical push-button, physical keyboard, or on-screen generated "virtual" buttons and keyboards that are integrated with touch displays. The term "gesture input device" refers to an input device for a computing system that is configured to receive the gesture input from a user. Mobile electronic devices and in-vehicle information systems include gesture input devices such as touch input devices that are configured to receive the gesture input through touchscreens and touchpads. Some touch input devices include cameras that are configured to monitor the movement of hands and fingers on a surface to identify gestures. Gestures include, but are not limited to, the use of one or more fingers and linear gestures. As used herein, the term "linear gesture" refers to a gesture that is formed from a straight or curved line.

As used herein, the term "haptic input device" refers to an input device that is housed in a mobile electronic device and that is configured to generates input signals based on physical movements of the mobile electronic device. For example, one or more accelerometer and gyroscope sensors in a mobile electronic device generate signals corresponding to movement of the mobile electronic device. Examples of movement that the haptic input device is configured to receive include, but are not limited to, rotating the device and shaking the mobile electronic device. A digital processing device, such as a digital controller or microprocessor, receives digitized sensor data from the accelerometers and gyroscopes to identify particular types of motion of the mobile electronic device with reference to the signals from the haptic input sensors.

While haptic input and gesture input both typically involve bodily movement from a user, the two terms are not used interchangeably in this document. For example, gesture inputs include a measurement of the movement of fingers, hands, or other bodily movements in relation to a particular gesture input device that is configured to identify the bodily movement external to the computing system. In contrast, the haptic input device does not identify particular bodily movements from the user external to the computing system, but instead measures movements for all or a portion of a mobile electronic device that are typically generated from bodily movements of the user.

Described herein is an in-vehicle information system 100 that integrates multiple input and output devices. The in-vehicle information system 100 includes the components described below in conjunction with the FIG. 1. In FIG. 1, an in-vehicle information system 100 includes a head-up display (HUD) 120, one or more console LCD panels 124, one or more input microphones 128, one or more output speakers 132, input reference regions 134A, 134B, and 136 over a steering wheel area 104, input regions 140 and 141 on nearby armrest areas 112 and 113 for one or both of left and right arms, respectively, and a motion sensing camera 144. The LCD display 124 optionally includes a touchscreen interface to receive gesture input. In some embodiments, LCD panels 124, armrest areas 112, 113, input regions 134A, 134B, 136, 140, 141, or the like receive gesture input to change the mode. A controller 148 is operatively connected to each of the components in the in-vehicle information system 100. The controller 148 includes one or more integrated circuits configured as a central processing unit (CPU), microcontroller, field programmable gate array (FPGA), application specific integrated circuit (ASIC), digital signal processor (DSP), or any other suitable digital logic device. The controller 148 also includes a memory, such as a solid state or magnetic data storage device, that stores programmed instructions that are executed by the controller 148 for operation of the in-vehicle information system 100. In some embodiments, the controller 148 connects to or incorporates additional components, such as a global positioning system (GPS) receiver 152 and wireless network device 154, to provide navigation and communication with external data networks and computing devices. The in-vehicle information system 100 is integrated with conventional components that are commonly found in motor vehicles including a windshield 102, dashboard 108, and steering wheel 104.

In the system 100, the input regions 134A, 134B, 136, and 140 provide a surface for a user in the vehicle to enter input data using hand motions or gestures. In one embodiment, the input regions include gesture sensor devices, such as infrared or Time of Fly (TOF) sensors, which identify input gestures from the user. In another embodiment, the camera 144 is mounted on the roof of the passenger compartment and views one or more of the gesture input regions 134A, 134B, 136, 140, and 141. In addition to gestures that are made while the user is in contact with a surface in the vehicle, the camera 144 records hand, arm, and head movement in a region around the driver, such as the region above the steering wheel 104. The LCD panel 124 also includes a touch sensor, such as a resistive or capacitive touchscreen sensor, and the user enters gesture input through direct contact with the touchscreen LCD panel 124.

On the steering wheel 104, the touch input regions 134A and 134B are located on the circumference of the steering wheel 104, where a user commonly places his or her hands during operation of the vehicle. In some circumstances the user also contacts the touch input region 136 to activate, for example, a horn in the vehicle. Additionally, the user may place an arm on the armrest 112. The controller 148 is configured to ignore touch inputs received from the touch regions except when the user is prompted to enter input data using the touch interface to prevent spurious inputs from the touch regions.

In some embodiments, the controller 148 is configured to identify written or typed input that is received from one of the touch interface regions in addition to identifying simple gestures entered through the touch regions. For example, the user engages the touch regions 136 or 140 with a finger to write characters or numbers. In another embodiment, the controller 148 displays a simplified virtual keyboard using the HUD 120 and the user selects keys using the touch input regions 136 or 140 while maintaining eye contact with the environment around the vehicle through the windshield 102.

The microphone 128 generates audio data from spoken input received from the user or another vehicle passenger. The controller 148 includes hardware, such as DSPs, which process the audio data, and software components, such as speech recognition software, to identify voice commands. Additionally, the controller 148 includes hardware and software components that enable generation of synthesized speech output through the speakers 132 to provide aural feedback to the user and passengers.

The in-vehicle information system 100 provides visual feedback to the user using the LCD panel 124, the HUD 120 that is projected onto the windshield 102, and through gauges, indicator lights, or additional LCD panels that are located in the dashboard 108. When the vehicle is in motion, the controller 148 optionally deactivates the LCD panel 124 or only displays a simplified output through the LCD panel 124 to reduce distraction to the user. The controller 148 displays visual feedback using the HUD 120 to enable the user to view the environment around the vehicle while receiving visual feedback. The controller 148 typically displays simplified data on the HUD 120 in a region corresponding to the peripheral vision of the user to ensure that the user has an unobstructed view of the road and environment around the vehicle.

As described above, the HUD 120 displays visual information on a portion of the windshield 120. As used herein, the term "HUD" refers generically to a wide range of head-up display devices including, but not limited to, combined head up displays (CHUDs) that include a separate combiner element, and the like. In some embodiments, the HUD 120 displays monochromatic text and graphics, while other HUD embodiments include multi-color displays. While the HUD 120 is depicted as displaying on the windshield 102, in alternative embodiments a head up unit is integrated with glasses, a helmet visor, or a reticle that the user wears during operation. As described below, either or both of the HUD 120 and the LCD display 124 display graphics and video data that assist the user in using the in-vehicle information system.

In some operating modes, the in-vehicle information system 100 operates independently, while in other operating modes, the in-vehicle information system 100 interacts with a mobile electronic device 170. The mobile electronic device 170 is illustrated as a handheld smartphone or tablet device in FIG. 1, but in alternative embodiments the mobile electronic device 170 is a wearable computing device or other portable computer. The in-vehicle information system communicates with the smartphone 170 using a wired interface, such as USB, or a wireless interface such as Bluetooth. The in-vehicle information system 100 provides a user interface that enables the user to control the mobile electronic device 170 with reduced distraction. For example, the in-vehicle information system 100 provides a combined voice and gesture based interface to enable the user to make phone calls or send text messages with the mobile electronic device 170 without requiring the user to hold or look at the device 170. In some embodiments, the device 170 includes various devices such as GPS and wireless networking devices that complement or replace the functionality of devices that are housed in the vehicle.

Figure 2:
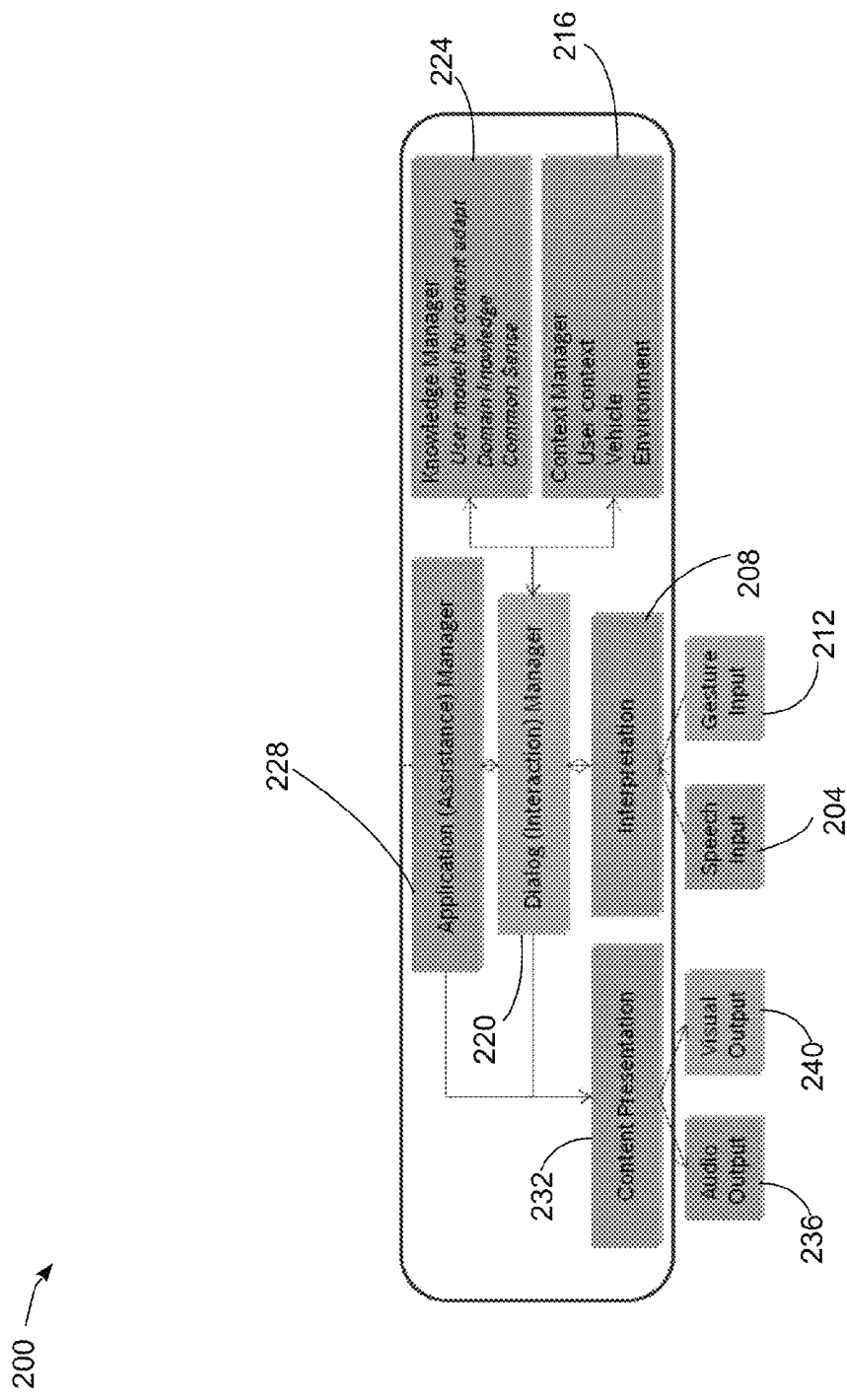
FIG. 2 is a system diagram of an in-vehicle information system.

The system framework 200 shown in FIG. 2 includes the following modules. "Modules" refers to software that when executed perform a particular function. The speech recognition module 204 converts acoustic signals to a word sequence with possible confidence scores associated with each word and the whole utterance. These data are passed onto the interpretation module 208 for further processing. The gesture recognition module 212 generates digital data corresponding to traces of any (e.g., pen, finger) movements and identifies the shapes from the traces (points, lines, circles, zoom in/out, shift left/right/up/down/any direction); the traces may also be a handwriting of symbols, such as letters, digits, etc. In addition, the traces may also include trace editing functions such "erase existing traces", "enlarge or shrink existing traces", or object selection functions such as "remove an object". The interpretation module 208 converts the multi-modal symbol sequences (e.g., word sequence, shapes) into meaning representations. Meaning representations include the action(s) the user asks the system to take, the objects the action(s) needs to apply onto, and the constraints related to the objects and actions.

The context management module 216 manages the dynamic information of the context, including the context used for recognizing speech, the active name lists used for recognizing proper names, the context of the active application (e.g., the current view of the map), the context of the active environment (e.g., road and traffic conditions, weather conditions, home temperature or humidity), the context of the user (e.g., the user is driving on high way, the user is making a turn onto a local street, the user is listening to music, the user is sleepy), or the context of the vehicle the user is driving (e.g., the gas tank level, the speed of the vehicle). The dialog management module 220 uses the context and environment information from the context management module to manage the interactions with the users. For example, when a user looks for a gas station on highway, the dialog management module 220 can assign a higher priority for the stations ahead than the stations that have already been passed.

The knowledge management module 224 manages the domain/application-related knowledge (e.g., ontology for point of interests in navigation, ontology for the components in home appliances, or ontology for services), the common sense knowledge (e.g., people need to drink water, people cannot fly without airplanes or the like, a car should remain on roads that are stored in a map), the knowledge about the users (personal preferences in different application domains), or the knowledge about language uses (e.g., the sentence or phrase structure). The knowledge content about a specific domain, for example, the navigation domain, can be obtained with a representation conversion from the corresponding service providers. The knowledge about the users can be constructed using the history of the past conversations between the users and the system as well as the actions the users took.

The application or application manager module 228 takes a task request from the dialog/interaction manager and tries to find one or more available services that may be used to complete the task request. The available services and assistance providers are maintained in a service registry in semantic forms. This module may use automatic service decomposition to decompose the task request into atomic requests that can be solved by the service providers. The application management module then uses a service composition approach to collect the sub-solutions from these providers and complete a solution for the requested task. This module can use any external intelligent assistance systems to find a solution for the task in hand.

When multiple solutions from the service providers and assistance systems are obtained for a requested task, the application manager 228 generates a ranking recommendation based on the quality of the solutions and the past performance of these service providers and assistance systems. The recommended solutions are then passed down to the dialog management module 220 for presentation to the users via content presentation module/TTS/visual output. After the user decides on one or more solutions and identifies these selected solutions through the dialog system, the confirmed solutions are executed. If more information is needed from the users, the dialog system communicates the required information to the users, collects the user feedback, reformulates the requirements for the task, and submits these data to the application module again for one or more new solutions. This process is repeated until either the system finds the solutions that meet the user's requirements, or the user discontinues the request refinements.

The dialog/interaction management module 220 manages the dialog between the user and the system. The dialog management module 220 takes the meaning representation from the interpretation module 208, resolving any ambiguity in the representation using the information from the context management module 216 and the knowledge management module 224, and then queries the application management module 228 for a response to the query. In case the application manager needs more information, the dialog module communicates the needed information to the content presentation module 232. If the results from different channels conflict, the dialog management module 220 performs a ranking procedure using the available knowledge from knowledge manager 224 and available context from the context manager 216. The manager informs the user if the conflicting results cannot be resolved by the system.

The content presentation module 232 converts the requested information into one or more sentences together with visual messages, such as a map, when needed to facilitate a user locating a position or selecting a number of points of interest (POIs). The one or more sentences are then sent to a text-to-speech module 236 and a visual display 240 to present the sentences to the user. The content presentation module 232 manages the format of the presentation of the information from the services or assistance channels by using audible output, visual output, or a combination of audible and visual outputs.

Figure 3:
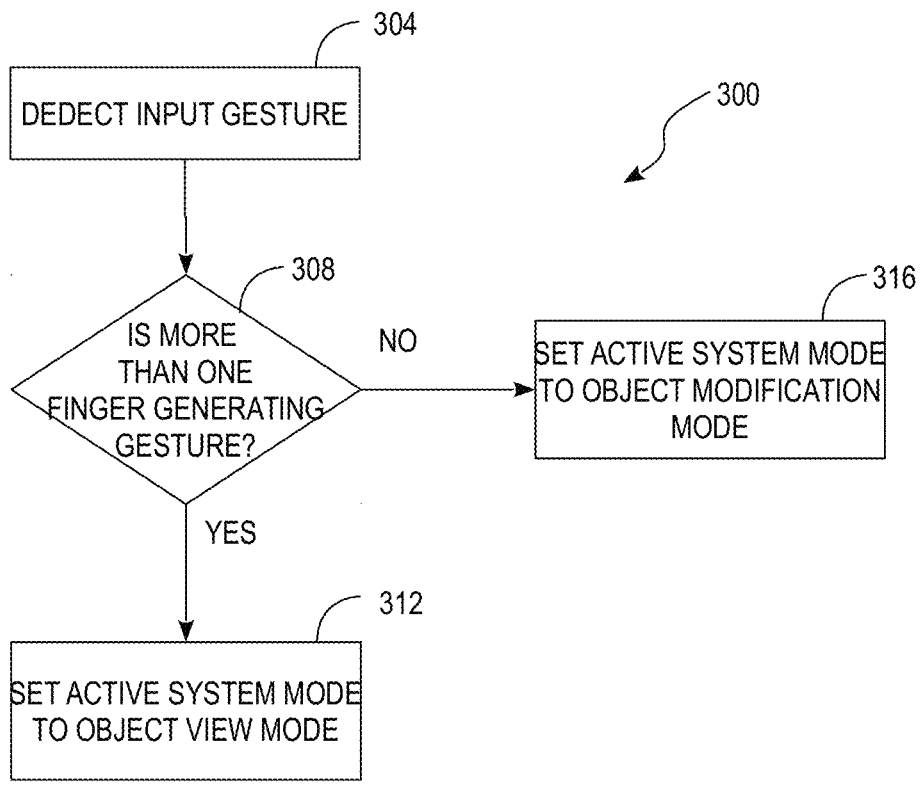
FIG. 3 is a block diagram of a process for interpreting a gesture input as indicating an operational mode should change.

FIG. 3 depicts a block diagram of a process 300 for changing the operating mode of a software program that is executed in a mobile electronic device using a one or two fingers as input gestures. In the description below, a reference to the process 300 performing an action or function refers to the operation of a controller or processor to executed stored program instructions to implement the action or function in conjunction with one or more components in a computing system.

Process 300 begins with the detection of an input gesture (block 304). The gesture input is evaluated to determine whether the user is using more than one finger to make a gesture on the screen (block 308). Capacitive touchscreen and touchpad input devices are examples of gesture input devices that generate different signals based on the number of fingers that engage the gesture input device to enable a controller to identify the number and relative locations of one or more fingers that engage the gesture input device. If only one finger is being used, the system sets the operational mode of the system to the object modification mode (block 316). In response to more than one finger being used to provide the gesture input, the process changes the operational mode to the object view mode (block 312). The process then proceeds with system processing in the newly activated mode. If the user changes from gesturing with multiple fingers to a single finger, the mode changes to the object modification mode.

Figure 6:
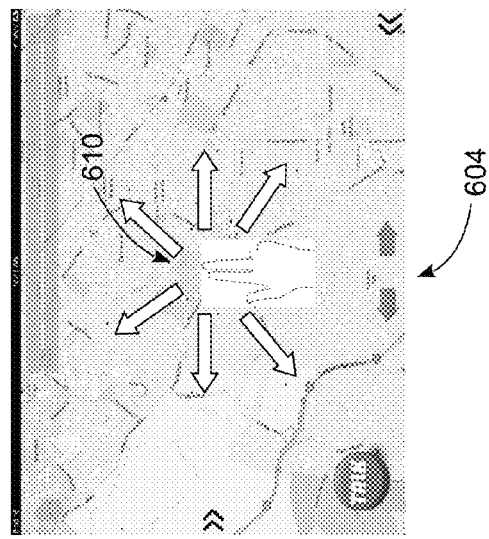
FIG. 6 is an illustration of a display in two different operating modes based on two different types of gesture input.
Figure 6:
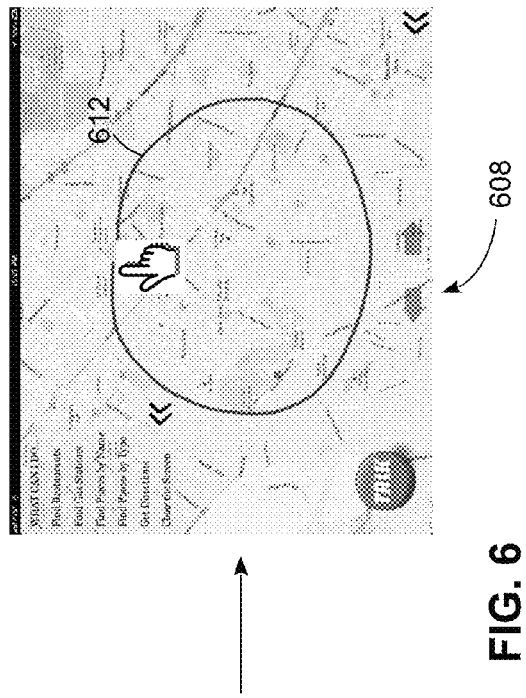

The use of different numbers of fingers in input gestures to change operating modes in a software program is illustrated in FIG. 6. In FIG. 6, the display 604 depicts a GUI in a first operating mode where an input gesture from a user that uses two fingers pans a display of a camera as indicated by the gesture movement arrows 610. The display 608 depicts the program in another operating mode where a gesture that uses a single finger forms an annotation 612 from a linear input gesture, such as the roughly circular linear gesture that is depicted in FIG. 6. While FIG. 6 depicts one transition between two different operating modes based on the number of fingers that are used to form input gestures, the controller performs operating mode transitions between three or more states in different embodiments of the process 300.

Figure 4:
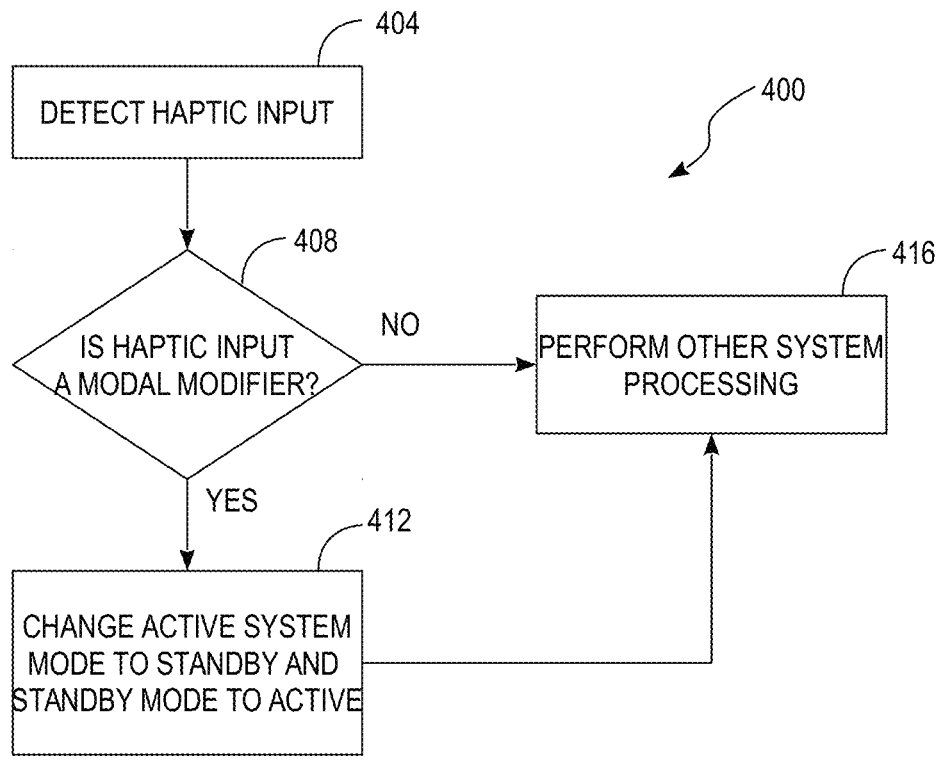
FIG. 4 is a block diagram of a process for interpreting a particular haptic input as indicating a particular operational mode should be active.

To change between an object view mode and an object modification mode in the system of FIG. 1 and FIG. 2, a method has been developed that uses a predetermined input gesture as a mode modifier. FIG. 4 depicts a process 400 for changing operating modes in a software program that is executed on a mobile electronic device through gesture input. In the description below, a reference to the process 400 performing an action or function refers to the operation of a controller or processor to executed stored program instructions to implement the action or function in conjunction with one or more components in a computing system.

The process 400 begins with the detection of haptic input (block 404). As described above, the user applies the haptic input to move the housing of a mobile electronic device, such as the smartphone 170 in the system 100. The haptic is evaluated to determine whether it is a mode modifier input (block 408). One or more accelerometers and gyroscopes in the mobile electronic device generate signals that correspond to the haptic input and a controller in the mobile electronic device identifies the haptic input. If the haptic input is not the mode modifier input, then the system continues with system processing in the current operational mode of the system (block 416). For example, if a user rotates the mobile electronic device 170, then the controller in the mobile electronic device 170 optionally changes the display between a landscape or portrait output, but does not otherwise change the operating mode of the software program that generates the display. In other instances, the haptic input corresponds to a predetermined haptic input that triggers a change in the operating mode of the software program. In one embodiment, the controller changes the active operational mode to a standby mode and changes the standby mode of operation to the active mode (block 412). The process then proceeds with system processing in the newly activated mode until the mode modifier haptic input is received again.

In one embodiment of the process 400, the mobile electronic device is configured to identify a shaking motion as the predetermined haptic input that triggers the change in the operating mode of the software program. A motion sensor, such as an accelerometer, generates one or more signals indicative of the shaking and the controller can interpret the signal indicative of the shaking as the mode modifier signal. In response, the controller changes the operational mode for the system accordingly.

Figure 7:
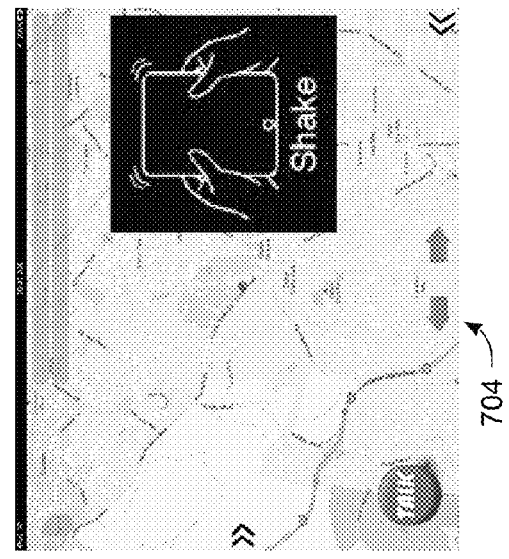
FIG. 7 is an illustration of a haptic input used to change an operational mode of the in-vehicle information system of FIG. 1.
Figure 7:
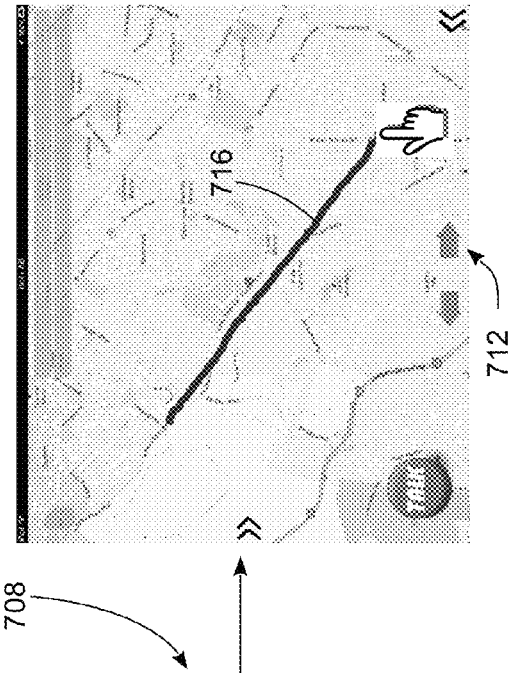

As depicted in FIG. 7, a mobile electronic device 708 presents a first GUI display 704 in a first operating mode. In the first operating mode, a linear input gesture with a gesture input device, such as a touchscreen input in the mobile electronic device 708, produces a panning motion on a map display in a similar manner to the panning gesture 610 in FIG. 6. To change operating modes for annotation, the user shakes the mobile electronic device 708. One or more accelerometers or gyroscopes in the mobile electronic device 708 are haptic input devices that generate signals corresponding to the shaking motion, and a digital controller in the mobile electronic device 708 executes the software program in a second operating mode in response to the identified shaking haptic input. In the example of FIG. 7, the second operating mode is an annotation mode depicted in the display 712 where the mobile electronic device 708 generates an annotation mark 716 in response to a linear gesture from the user instead of panning the display of the map. While FIG. 7 depicts one transition between two different operating modes based on the predetermined haptic input to a mobile electronic device, the controller performs operating mode transitions between three or more states in different embodiments of the process 400. Additionally, the user can apply the predetermined haptic input to the mobile electronic device to return to a previously used operating mode in the software program and switch between operating modes as needed while using the software program.

Figure 5:
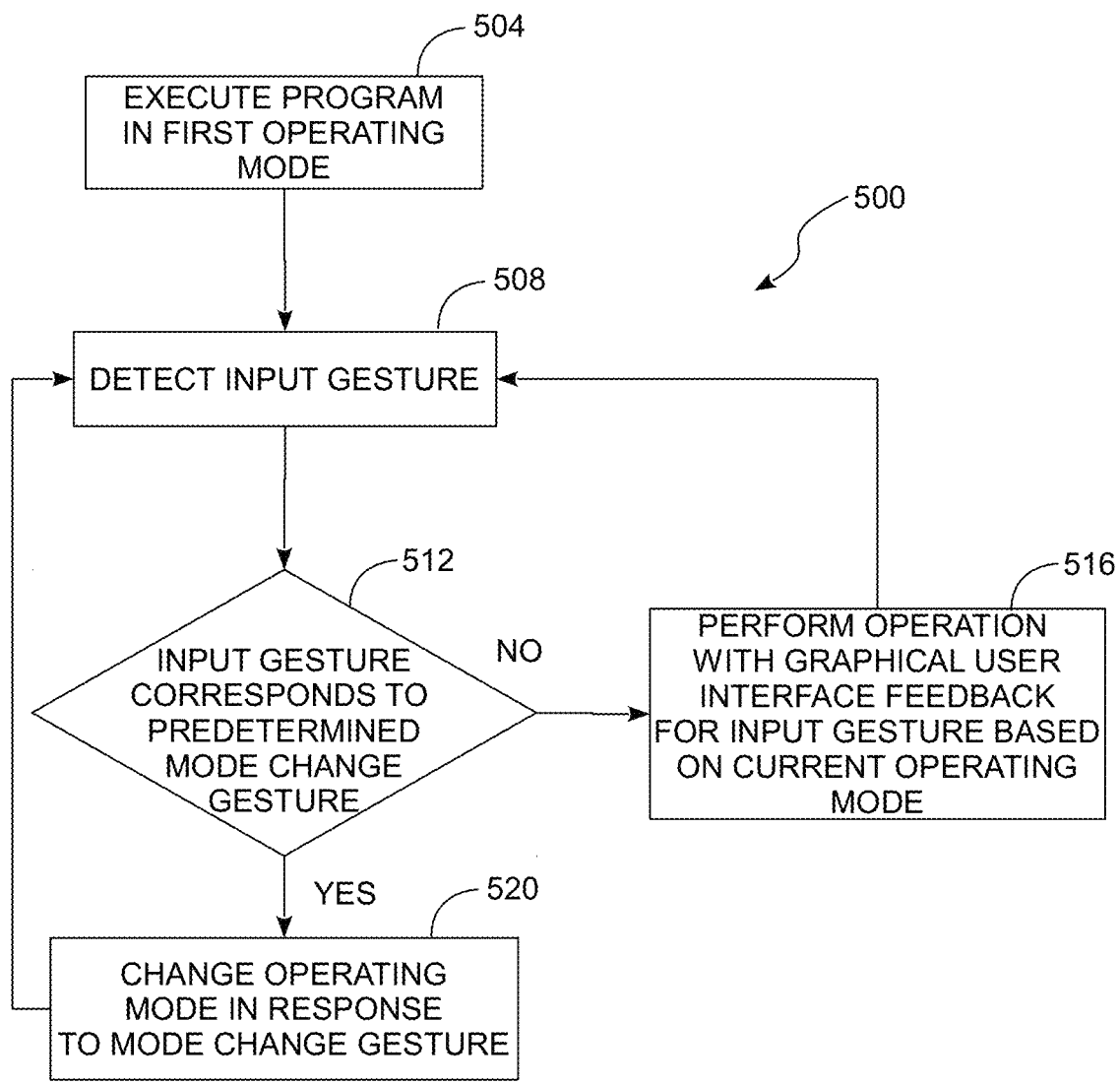
FIG. 5 is a block diagram of a process for changing an operating mode of a software program using a predetermined input gesture to enable a computing device to perform different actions for another set of input gestures in different operating modes.

FIG. 5 depicts a block diagram of a process 500 for changing operating modes in a software program in response to a predetermined input gesture. In the description below, a reference to the process 500 performing an action or function refers to the operation of a controller or processor to executed stored program instructions to implement the action or function in conjunction with one or more components in a computing system.

Process 500 begins as the controller executes a software program in a first operating mode (block 504). Using the mapping software program that is described above as an illustrative example, the controller 148 generates a display of the map with the LCD 124. In the first operating mode, the touchscreen interface in the LCD 124 accepts gesture input from a user to pan the map across the LCD display 124 in a similar manner to the panning gesture 610 in FIG. 6. In another configuration, the controller in the mobile electronic device 170 executes the software program. The built-in display and touchscreen components in the mobile electronic device 170 generate a GUI and accept gesture input, respectively.

Figure 8:
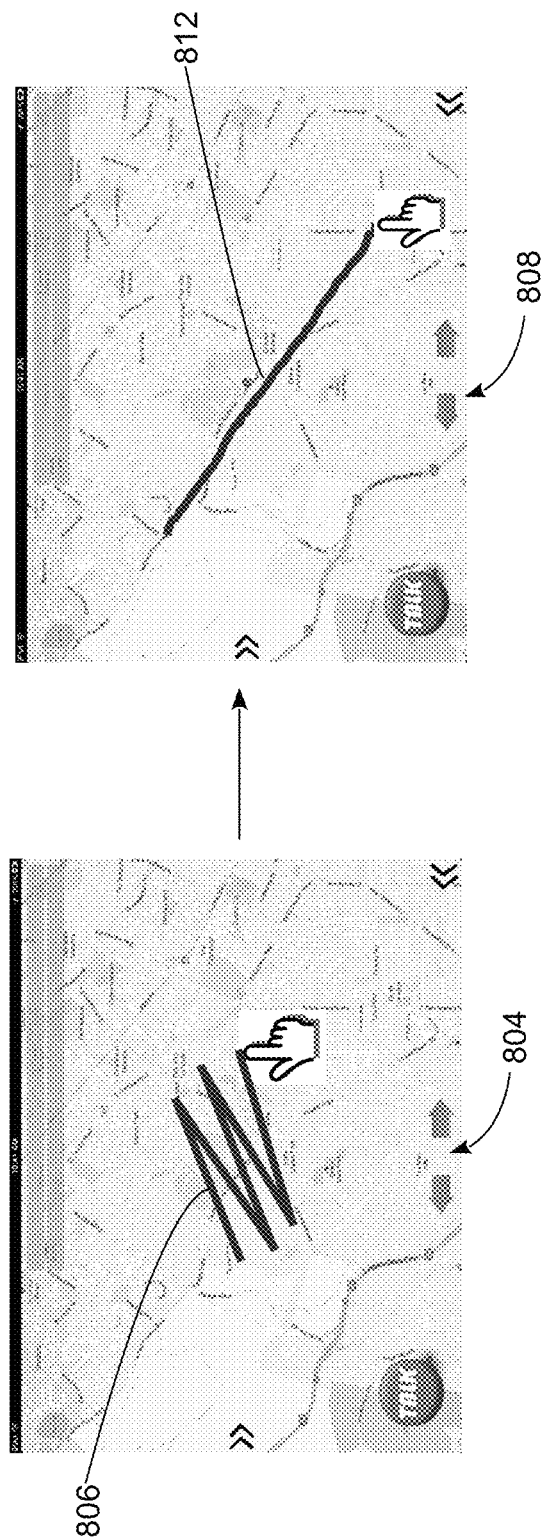
FIG. 8 is an illustration of a predetermined gesture input to a mobile electronic device that changes an operating mode of a software program that is executed by the mobile electronic device.

During process 500, the controller continues to operate the software program in the first operating mode and detects input gestures (block 508). If the input gesture is not a predetermined input gesture that triggers a change in the operating mode (block 512) then the controller identifies the gesture as an input to the software program in the current operating mode (block 516). For example, FIG. 8 depicts two graphical displays 804 and 808 that correspond to two different operating modes for a mapping software program. In the operating mode depicted by the display 804, linear input gestures pan the display of the map in a similar manner to the gesture 610 depicted in FIG. 6. In the operating mode depicted by the display 808, the linear gesture produces an annotation mark 812 to select objects or regions on the map instead of panning the map. The controller identifies input gestures within the current operating mode with the exception of one or more predetermined mode change input gestures. The mode change input gestures are described in more detail below.

The controller continues to detect input gestures (block 508) and operate the software program in a single operating mode until the gesture input device receives a predetermined input gesture that corresponds to an input request to change the operating mode of the software program (block 512). The predetermined gesture input that triggers an operational mode change includes a range of input gestures that can be reproduced by the average user in an efficient manner and that a digital controller recognizes as being different than standard input gestures that are commonly used in different operating modes of the software program. The controller identifies the predetermined mode change input gesture and continues operating the software program in another operating mode where additional gesture inputs from the user result in different modifications to the GUI output for the software program (block 520). The process 500 continues as the controller identifies additional gesture inputs from the user. The controller executes the software program in each operating mode until the user enters the predetermined mode change gesture to change modes. While the description herein depicts two operating modes for illustrative purposes, the predetermined input gestures can be used to switch between three or more operating modes in some software embodiments.

In the illustrative example of FIG. 8, a predetermined mode change input gesture 806 is depicted in the display 804. In FIG. 8, the predetermined mode change gesture 806 changes the operating mode of the software program to the annotation mode depicted in the display 808 instead of the map movement mode in the display 804. The predetermined gesture 806 is sufficiently distinct from the range of expected input gestures that a controller identifies the predetermined gesture 806 for changing the operating instead of a form of user input within a current operating mode. In the example of FIG. 8, the predetermined mode change gesture 806 can be described as a pair of vertically stacked Zs. The user inputs the vertically stacked Zs using a rapid input motion that is sufficiently distinct from the standard motion for panning the map or for entry of a graphical annotation to trigger the change in operating mode.

When the user enters the predetermined mode change input gesture 806 with the touchscreen 124 or other touch input device, the system changes from the active mode to the standby mode. For example, if the current active mode is the object view mode when the gesture is made on the screen, the object modification mode is activated and the object view mode is changed to the standby mode. Thereafter, gestures are depicted on the screen as depicted by the annotation mark 812 rather than moving the map as depicted in the display 804. Additionally, the lighting or some other visual aspect of the display, such as the background, can be changed to indicate that the current mode is the object modification mode. This visual signal enables a user to readily detect which mode is active and determine whether the user wants to change the mode. While FIG. 8 depicts one transition between two different operating modes based on the input of the predetermined gesture, the controller performs operating mode transitions between three or more states in different embodiments of the process 500. Additionally, the user can apply the predetermined mode change gesture as gesture input to return to a previously used operating mode in the software program and switch between operating modes as needed while using the software program.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for operating a mobile electronic device comprising:
   executing with a controller in the mobile electronic device stored program instructions for a software program in a first operating mode;
   generating with the controller and a graphical display device in the mobile electronic device a graphical user interface (GUI) for the software program in the first operating mode;
   receiving with a first input device in the mobile electronic device configured to receive gesture input a first gesture from a user in the first operating mode;
   generating with the controller a first modification of the GUI for the software program in the first operating mode in response to the first gesture;
   identifying with the controller a predetermined haptic input received from a second input device configured to receive haptic input in the mobile electronic device;
   executing with the controller the stored program instructions for the software program in a second operating mode in response to identifying the predetermined haptic input, the second operating mode being different than the first operating mode;
   receiving with the first input device the first gesture from the user in the second operating mode; and
   generating with the controller a second modification of the GUI for the software program in the second operating mode in response to the first gesture, the second modification of the GUI being different than the first modification of the GUI.

2. The method of claim 1, the first modification of the GUI in the first operating mode further comprising:
   panning with the controller a display of a map across the display in response to the first gesture being a linear gesture.

3. The method of claim 2, the second modification of the GUI in the second operating mode further comprising:
   generating a linear graphic with the controller on the display in response to the linear gesture.

4. The method of claim 1, the identification of the predetermined haptic input further comprising:
   identifying with the controller a shaking motion of the mobile electronic device that corresponds to the predetermined haptic input in response to a plurality of signals from an accelerometer in the mobile electronic device.

5. A method for operating a computing device comprising:
   executing with a controller in the computing device stored program instructions for a software program in a first operating mode;
   generating with the controller and a graphical display device in the computing device a graphical user interface (GUI) for the software program in the first operating mode;
   receiving with an input device configured to receive gesture input a first gesture from a user in the first operating mode;
   generating with the controller a first modification of the GUI for the software program in the first operating mode in response to the first gesture;
   identifying with the controller a second predetermined gesture received from the input device, the second predetermined gesture being different than the first gesture;
   executing with the controller the stored program instructions for the software program to operate in a second operating mode in response to the second predetermined gesture;
   receiving with the input device the first gesture from the user in the second operating mode; and
   generating with the controller a second modification of the GUI for the software program in the second operating mode in response to the first gesture, the second modification of the GUI being different than the first modification of the GUI.

6. The method of claim 5, the first modification of the GUI in the first operating mode further comprising:
   panning with the controller a display of a map across the display in response to the first gesture being a linear gesture.

7. The method of claim 5, the second modification of the GUI in the second operating mode further comprising:

generating with the controller a linear graphic on the display in response to the first gesture being the linear gesture.

8. The method of claim 5, the identification of the second predetermined gesture further comprising:
identifying with the controller the second predetermined gesture in response to a plurality of Z-shaped input gestures from the input device that do not correspond to the first gesture.

9. A computing system comprising:
a display device;
a first input device configured to receive gesture input from a user; and
a controller operatively connected to the display device and the first input device, the controller being configured to:
execute stored program instructions for a software program in a first operating mode;
generate a graphical display a graphical user interface (GUI) for the software program in the first operating mode;
receive a first gesture from the user while the software program operates in the first operating mode;
generate a first modification of the GUI for the software program in the first operating mode in response to the first gesture;
receive a second predetermined gesture from the user that is different than the first gesture;
execute the stored program instructions for the software program to operate in a second operating mode in response to the second predetermined gesture;
receive the first gesture from the user while the program operates in the second operating mode; and
generate a second modification of the GUI for the software program in the second operating mode in response to the first gesture, the second modification of the GUI being different than the first modification of the GUI.

10. The computing system of claim 9 further comprising:
a second input device configured to receive haptic input from the user; and
the controller being operatively connected to the second input device and further configured to:
receive a predetermined haptic input to the computing system from the user; and
execute the stored program instructions for the software program to operate in the second operating mode in response to the predetermined haptic input.

11. The computing system of claim 10 wherein the second input device comprises an accelerometer, and the controller being further configured to:
identify a motion of the computing system in response to a plurality of signals from the accelerometer; and
execute the stored program instructions for the software program to operate in the second operating mode in response to the plurality of signals from the accelerometer corresponding to a shaking haptic input.

12. The computing system of claim 9, the controller being further configured to:
pan a display of a map across the display device in response to the first gesture being a linear gesture in the first operating mode.

13. The computing system of claim 9, the controller being further configured to:
generate a linear graphic on the display device in response to the linear gesture in the second operating mode.

14. The computing system of claim 9, the controller being further configured to:
identify a plurality of Z-shaped input gestures that correspond to the predetermined second gesture; and
execute the stored program instructions for the software program to operate in the second operating mode in response to identifying the plurality of Z-shaped gestures.

* * * * *